March 23, 1971

L. A. TRUGMAN 3,572,132

FLUIDIC ACCELEROMETER

Filed Nov. 1, 1968

INVENTOR.
LEONARD A. TRUGMAN
BY Herbert L. Davis

ATTORNEY

INVENTOR.
LEONARD A. TRUGMAN
BY Herbert L. Davis
ATTORNEY

United States Patent Office 3,572,132
Patented Mar. 23, 1971

3,572,132
FLUIDIC ACCELEROMETER
Leonard A. Trugman, Ridgewood, N.J., assignor to
The Bendix Corporation
Filed Nov. 1, 1968, Ser. No. 772,677
Int. Cl. G01p 15/02
U.S. Cl. 73—515                                    5 Claims

ABSTRACT OF THE DISCLOSURE

A fluidic accelerometer including an elastic flapper valve member sensitive to accelerational forces applied along an axis transverse the flapper valve member to cause deflection of the flapper valve member so as to unbalance a fluidic bridge circuit which gives rise to a differential pressure at outputs of the accelerometer. The fluidic bridge circuit includes two flow matched restrictors and two control nozzles operated by the flapper valve member in response to the accelerational forces applied to the flapper valve member along the sensitive axis thereof.

BACKGROUND OF THE INVENTION

Field of the invention

This invention relates to a field of acceleration responsive devices and more particularly to a fluidic acceleration sensor responsive to acceleration and deceleration forces to generate a differential fluid pressure output proportional to the sensed acceleration.

PRIOR ART OF THE INVENTION

Heretofore there have been provided acceleration responsive devices of a type such as disclosed in a U.S. Pat. No. 3,014,373 granted Dec. 26, 1961 to Torsten Lindbom for an Acceleration Feedback System in which there has been provided a movable control valve member urged towards a central position between valve seats by a pneumatic bias.

In the device of the aforenoted patent this pneumatic bias is produced by applying the same pneumatic pressure derived from a pressure source to two conduits leading to the two valve seats. Each of the conduits include a restrictive orifice and two output ducts which detect the pneumatic pressures at the respective valve seats. Therefore, any difference in the widths of the gaps produces a proportional pressure difference in the output ducts.

However, in the acceleration responsive device of the aforenoted patent the movable valve member comprises a pendulum suspended by a hinge from a fixed support to permit a swinging motion of a valve member between the two valve seats. The valve seats also contribute stops limiting the motion of the pendulum in either direction and are preferably arranged to shut off the flow of air completely when in contact with the corresponding side surface of the pendulum.

However, in order to apply accelerative forces to the pendulum an acceleration input member comprising a rack, extending substantially perpendicular to the pendulum and supported for longitudinal movement in either direction, is linked to the pendulum through a complex mechanism including a pinion and axial shaft arrangement in which the shaft is rotatably supported in the pendulum by a bearing and also carries a gear adapted to drive an inertia device which may be a flywheel secured to another shaft which is rotatably mounted in a fixed support and linked through the aforenoted gear to the pendulum 34.

In the present invention by adding a new idea and a new feature—an elastic flapper valve member as an inertial element—in assembling older features of an accelerometer, practically the same result is reached with less expense. The invention rests in a conception which simplifies complex mechanism and reduces the number of parts, while at the same time raising the percent of durability and certain of operation—in other words, in creating a condition of greater durability, and one which is more sure to produce practically the same result in emergencies, and not only with greater certainty, but with less expense.

In addition to the aforenoted U.S. Pat. No. 3,014,373, there has also been noted in the prior art, as of interest in showing other forms of fluid operated accelerometers, a U.S. Pat. No. 3,042,343, granted July 3, 1962 to Conrad H. Cooke et al.; a U.S. Pat. No. 3,263,505, granted Aug. 2, 1966 to William E. Grunwald; a U.S. Pat. No. 3,276,464, granted Oct 4, 1966 to Eric E. Metzger; and a U.S. Pat. No. 3,278,139, granted Oct. 11, 1966 to Charles H. Borcher et al.

The foregoing patents, however, all fail to suggest the simplified arrangement of the present invention in the provision of an elastic flapper valve member as the inertial element in the fluidic accelerometer, particularly as applied in a fluidic bridge circuit in which the deflection of the elastic flapper valve member in response to accelerational forces acting along a sensitive axis extending transverse the flapper valve member causes the balance of the fluidic bridge circuit to be disturbed thus giving rise to a differential pressure at outputs of the device.

SUMMARY OF THE INVENTION

The present invention relates to simplified means in which an elastic flapper valve member provides the inertial element in an accelerometer in which accelerational forces applied along a sensitive axis transverse the elastic flapper valve member causes a deflection of the flapper valve member to unbalance a fluidic bridge circuit giving rise to a differential pressure at outputs thereof.

An object of the invention is to provide a compact arrangement for simplifying complex mechanisms, heretofore utilized in acceleration responsive devices of a type such as described in the forenoted U.S. Pat. No. 3,014,373, by so arranging an elastic flapper valve member as the inertial element of the accelerometer in such a manner that accelerational forces applied along a sensitive axis causes a deflection of the flapper valve member and a resultant unbalancing of a fluidic bridge circuit so as to give rise to a differential pressure at the outputs of the device proportional to the sensed accelerational forces.

Another object of the invention is to provide in such a fluidic accelerometer simplified means by which the gain of the accelerometer in response to sensed accelerational forces may be adjusted by varying the relative location along the length of the elastic flapper valve member of valve nozzles controlled by the flapper valve member.

Another object of the invention is to provide simplified means whereby the gain of the fluidic accelerometer may be adjusted by varying the inertia of the elastic flapper valve element.

A further object of the invention is to provide means whereby the relative location of the respective controlled valve nozzles may be independently varied along the length of the flapper valve member so as to alter the relative gain of the accelerometer in response to accelerational and decelerational forces acting on the flapper valve member in opposite senses.

These and other objects and features of the invention are pointed out in the following descriptions in terms of the embodiments thereof which are shown in the accompanied drawings.

DESCRIPTION OF THE INVENTION

Figure 1:
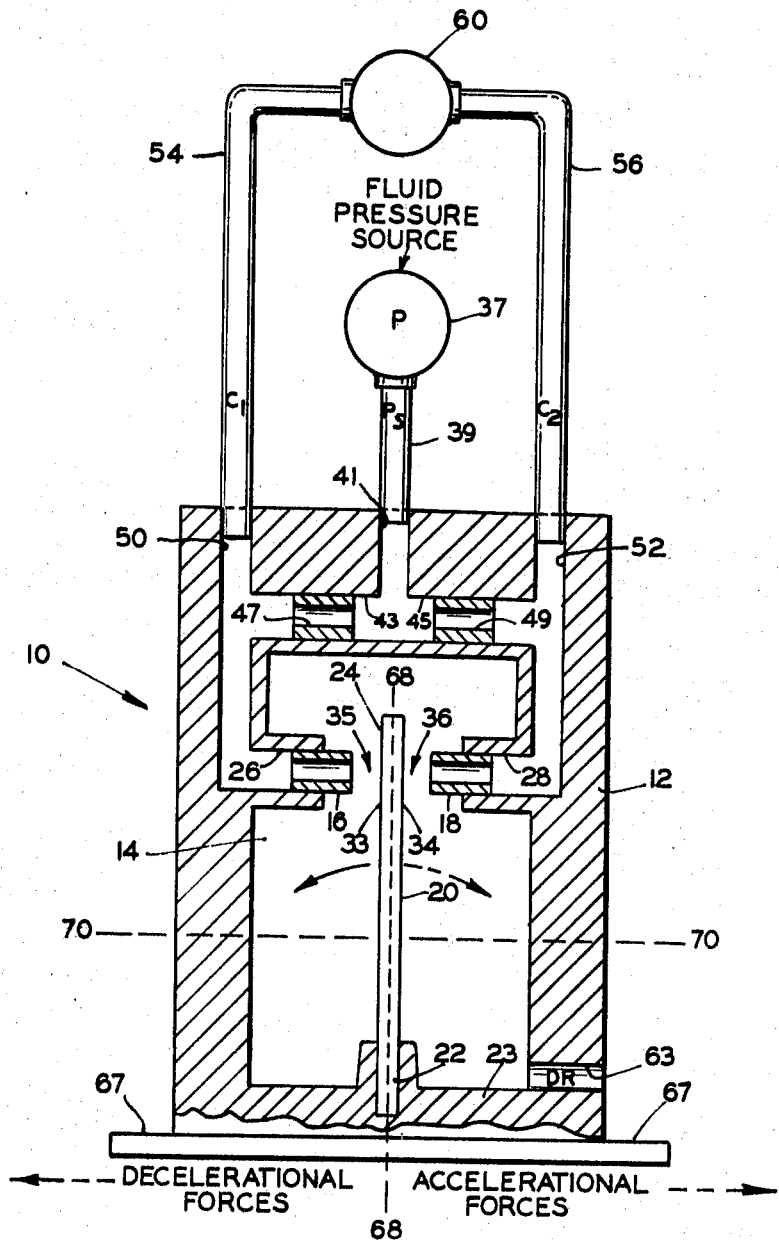
FIG. 1 is a schematic view of a fluidic accelerometer embodying the present invention and illustrating an elastic flapper valve member arranged in an operative relation in a fluidic bridge circuit controlled by the elastic flapper valve member in response to accelerational forces applied along a sensitive axis extending transverse the flapper valve member.

Referring to the drawing of FIG. 1 an acceleration responsive device embodying the present invention is indicated generally by the numeral 10. It includes a casting 12 having a cavity 14 formed therein and into which projects two opposed fluid pressure nozzles 16 and 18 positioned at opposite sides of a flexible flapper valve member 20 affixed at one end 22 to the base 23 of the casting 12. A free upper end portion 24 of the flapper valve member 20 extends in controlling relation to openings in the nozzles 16 and 18. The nozzles 16 and 18 are in turn engaged in ports of fluid pressure channels 26 and 28 formed in the casting 12.

Upon the flexible control flapper valve member 20 being at a normal neutral position between the nozzles 16 and 18, as illustrated in FIG. 1, the opposite side surfaces 33 and 34 are spaced from the openings in the nozzles 16 and 18 by equal gaps 35 and 36, respectively, so as to permit a controlling fluid pressure medium such as air or liquid under pressure to escape from each of the openings of the nozzles 16 and 18 at a controlled rate.

The flexible flapper valve member 20 is urged towards the neutral position between the openings in the nozzles 16 and 18 and is normally maintained in that position by applying the same fluid pressure, derived from a fluid pressure source 37, at the opposite side surfaces 33 and 34 of the valve member 20. The fluid pressure source 37 is connected through a conduit 39 to a pressure passage 41 formed in the casting 12 and which leads to two conduits 43 and 45. The conduits 43 and 45 are in turn connected through two flow matched restrictors 47 and 49 leading in turn to the respective pressure channels 26 and 28 and thereby to the respective nozzles 16 and 18.

Each of the channels 26 and 28 include output passages 50 and 52, respectively, through which are applied the fluid pressures applicable at the nozzles 16 and 18. Further the output passages 50 and 52 are connected through output conductors 54 and 56 to a differential pressure sensitive device 60 of conventional type sensitive to the difference in the fluid pressures applied at the output passages 50 and 52. A drain passage 63 is formed in the block 12 and leads from the chamber 14 so as to permit the fluid pressure medium exhausting through the openings in the nozzles 16 and 18 to the chamber 14 to be drained from the chamber 14 to the exterior.

The acceleration responsive device 10 has a casting 12 affixed by a footed portion 67 to the body of an aircraft or other suitable movable object, the acceleration of which is to be sensed. The accelerational forces are sensed along an axis 70—70 extending transverse a neutral axis 68—68 of the elastic flapper valve member 20.

OPERATION OF FLUIDIC ACCELEROMETER OF FIG. 1

The acceleration responsive device 10 of FIG. 1 operates in the following manner: accelerational forces may be applied along the sensitive axis 70—70 extending transverse the neutral axis 68—68 of the elastic flapper valve member 20 so as to cause a deflection of the flapper valve 20 about the fixed end 22 in accordance with the well known laws of elasticity. For example if the nozzles 16 and 18 are located at one-quarter length points relative relative to the flapper valve member 20, as shown for example in FIG. 1, the deflection of the elastic flapper valve member 20 about the fixed end 22 is given by the following equation.

$$\delta \approx \frac{1}{12} \frac{W_F}{EI} l3 (g's)$$

where $W_F$ is the weight of the flapper valve member 20,
E is the modulus of elasticity of the flapper valve member 20,
I is the moment of inertia about the axis 68—68
$l$ is the length of the flapper valve member 20, and
$g$'s is the number of $g$'s applied along the sensitive axis 70—70 extending transverse the longitudinal axis 68—68 of the valve member 20.

The deflection of the flapper valve member 20 causes the fluidic bridge circuit balance to be disturbed thus giving rise to a differential pressure $C_1 - C_2$ at the outputs 54 and 56 of the device 10. The fluidic circuit consists of the two flow matched restrictors 47 and 49, and two nozzles 16 and 18. $P_s$ is the supply pressure to the sensor and $D_R$ is the drain or exhaust pressure.

Figure 6:
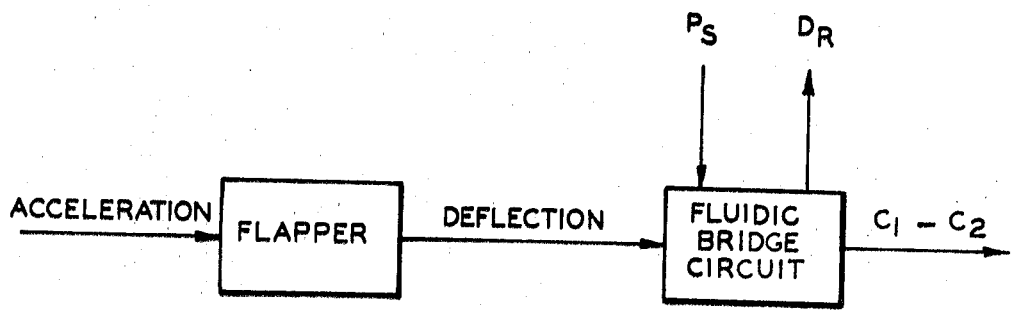
FIG. 6 is a block diagram illustrating the operation of the fluidic accelerometer of FIGS. 1–5.
Figure 7:
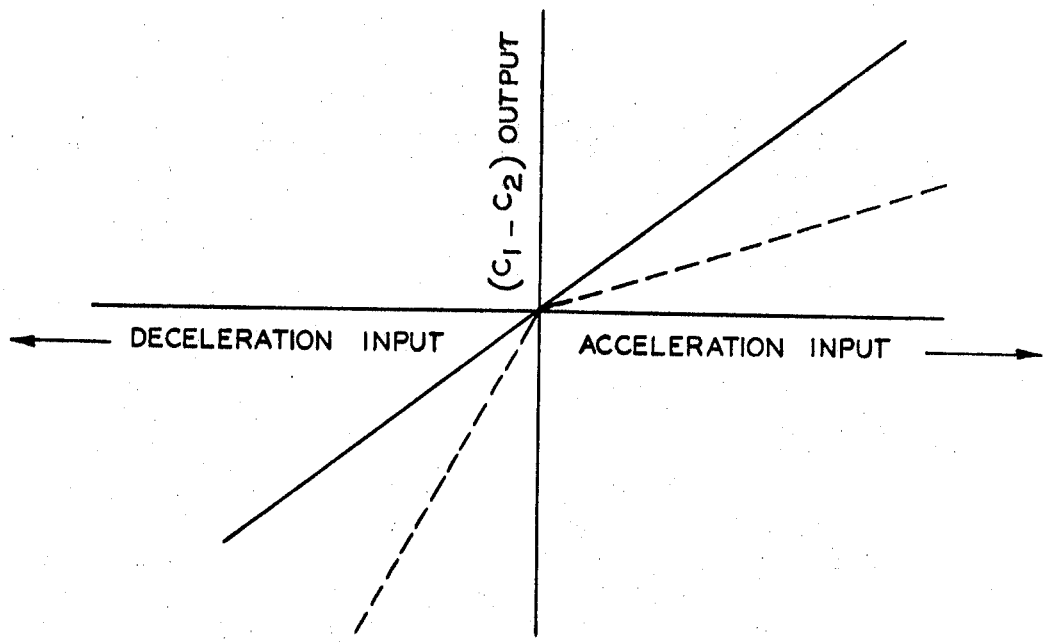
FIG. 7 is a graphical illustration of the input-output characteristics of the fluidic accelerometer of FIGS. 1–3 and illustrating by dash lines the different output results which may be effected upon an independent adjustment in opposite senses of the control nozzles relative one to the other along the length of the flapper valve member by the means illustrated in FIGS. 4 and 5 and upon the fluidic accelerometer being subjected to an accelerational input acting in one sense or a decelerational input acting in an opposite sense.

FIG. 6 illustrated a functional block diagram of the device 10 of FIG. 1, while the input-output characteristics of the fluidic accelerometer of FIG. 1 is shown graphically by the solid lines of the drawing of FIG. 7 as proportional to sensed accelerational and decelerational forces.

Features of the fluidic accelerometer of FIG. 1 include the use of the elastic flapper valve member 20 as the inertial element of the accelerometer, particularly as applied to control the fluid pressure balance of a fluidic bridge circuit so as to provide a differential pressure at the output conductors 54 and 56 thereof proportiional to the accelerational forces sensed by the elastic flapper valve 20 along the axis 70—70 extending transverse the neutral axis 68—68.

MODIFIED FORM OF INVENTION OF FIG. 2

Figure 2:
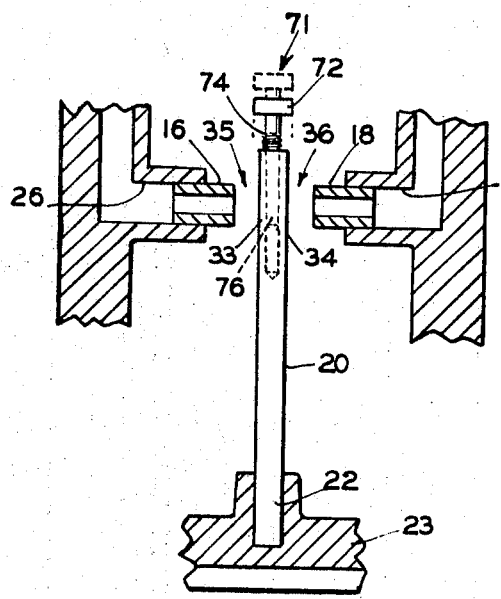
FIG. 2 is a fragmentary sectional view illustrating means whereby adjustability of the output gain of the fluidic accelerometer may be effected by adjustably positioning a weighted screw element at the free end of a controlling elastic flapper valve member.

In the modified form of the invention illustrated by FIG. 2, there is provided a novel means whereby the gain of the accelerometer may be adjusted by varying the inertia of the elastic flapper valve member 20.

This is effected by the provision of a weighted element 71 having an end portion 72 and a screw stem portion 74 arranged to be screw threadedly engaged in a channel 76 extending lengthwise of the elastic flapper valve 20 and opening at the free end thereof so that the relative position of the head portion 72 of the weighted element 71 relative to the free end portion 24 may be varied by conveniently adjusting the stem portion 74 in or out of the channel 76 of the elastic flapper valve member 20. Thus the inertia of the flapper valve member 20 may be adjusted, and thereby the gain of the accelerometer.

MODIFIED FORM OF THE INVENTION OF FIG. 3

Figure 3:
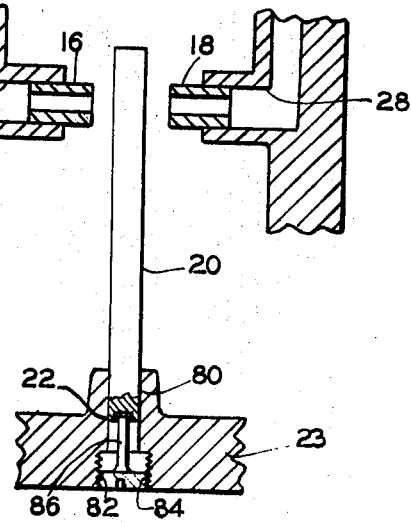
FIG. 3 is a fragmentary sectional view of the inertial flapper valve assembly illustrating another means whereby the output gain of the fluidic accelerometer may be adjusted by varying the effective length of the elastic flapper valve member and thereby the relative location of the nozzles controlled thereby, through adjustment of a suitable positioning screw provided at a fixed end of the flapper valve member.

A further modified form the invention is illustrated by FIG. 3 in which the gain of the accelerometer is adjusted by varying the relative location lengthwise of the flapper valve member 20 in relation to the nozzles 16 and 18. This is provided, as shown in FIG. 3, by slidably positioning the elastic flapper valve member 20 lengthwise in a channel 80 extending transverse the base 23 of the casting 10.

The position of the elastic flapper valve member 20 in the channels 80 is effected by an adjustable bolt 82 screw threadedly engaged in screw threads provided in a recess 84 formed in an underside of the base 23. The bolt 82 has a stem 86 which at an inner end captures the end 22 of the elastic flapper valve 20 so as to provide a longitudinal adjustment of the elastic flapper valve member 20 in the channel 80 upon an adjustment of the bolt 82.

MODIFIED FORM OF THE INVENTION OF FIG. 4

Figure 4:
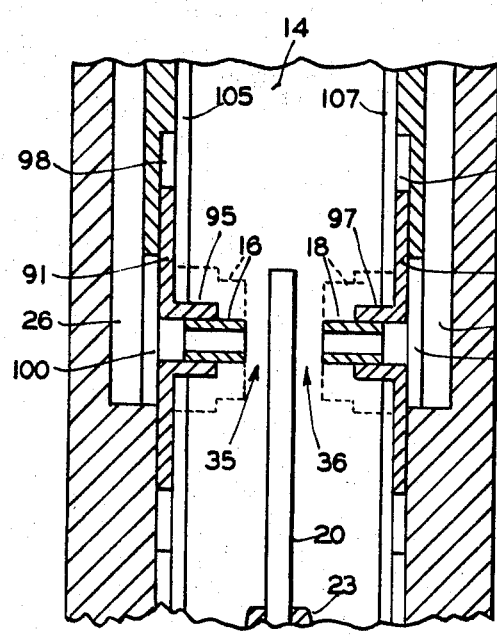
FIG. 4 is a fragmentary sectional view of a further modified form of the invention illustrating another means for effecting gain adjustability in the fluidic accelerometer by varying the relative location along the length of the flapper valve element of the valve nozzles controlled by the flapper valve member independently one of the other.

A further modified form of the invention is illustrated in FIG. 4 in which the gain of the accelerometer may be conveniently adjusted by varying the relative location of the nozzles 16 and 18 along the length of the flapper valve 20.

In the invention of FIG. 4, the foregoing is effected by plates 91 and 93 carrying two tubular elements 95 and 97 projecting perpendicularly therefrom and in which are positioned nozzles 16 and 18, respectively. The plates 91 and 93 are slidably mounted in sealing relation in channels 98 and 99 formed in the inner side wall of the chamber 14 and adjacent slots 100 and 101, respectively, opening into the passages 26 and 28. The plates 91 and 93 may be clamped in the adjusted position by suitable fastening plates 105 and 107 of conventional type secured in the inner side walls of the chamber 14 by removable fastening bolts.

Thus the plates 91 and 93 may be slidably positioned in the slots 98 and 99, respectively, so as to position the nozzles 16 and 18 along the length of the flexible flapper valve member 20. Adjustment of the gain of the accelerometer may be effected by varying the location of the nozzles 16 and 18 in relation to the length of the flapper valve member 20. Moreover, one of the nozzles 16 may be adjusted toward the free end of the elastic flapper valve 20, while the other nozzle 18 may be adjusted in an opposite sense toward the base 23 of the chamber 14 so that the input-output characteristic of the fluidic accelerometer may provide a fluid pressure output characteristic of a predetermined range of values upon accelerational forces being applied to the flapper valve member 20 and a fluid pressure output characteristic of another predetermined range of values decelerational forces being applied to the flapper valve member 20, as shown graphically by the dash lines of FIG. 7.

MODIFIED FORM OF THE INVENTION OF FIG. 5

Figure 5:
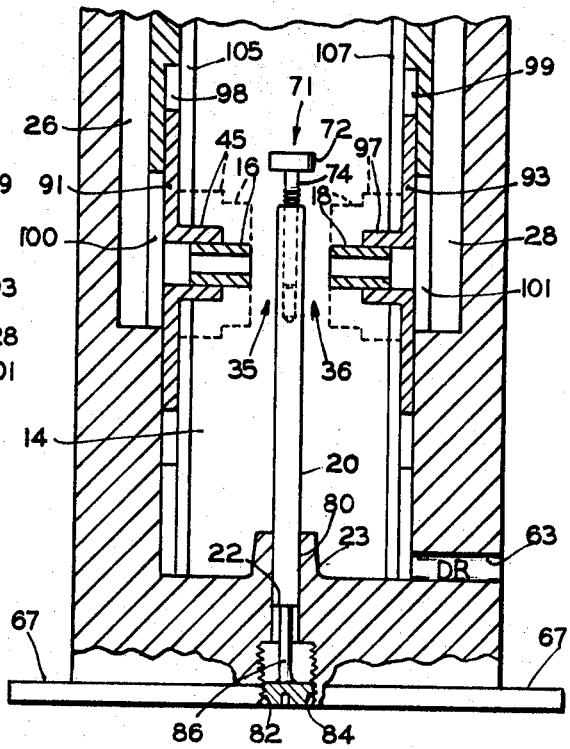
FIG. 5 is a fragmentary sectional view of a further modified form of the invention illustrating a combination of the several gain adjustability means of FIGS. 2, 3 and 4.

In the modified form of the invention illustrated in FIG. 5, the structural features of FIGS. 2, 3 and 4 have been combined in a single accelerometer device. Corresponding numerals to those heretofore described with reference to FIGS. 2, 3 and 4 indicate corresponding parts and in the operation of the combined form of the invention illustrated in FIG. 5, it will be readily apparent that the description heretofore applied to FIGS. 1, 2, 3 and 4 will be applicable thereto and, therefore, no further explanation is deemed necessary.

It will be seen then that in the form of the invention shown in FIG. 5, the inertia of the elastic flapper valve member 20 may be readily adjusted by positioning the weighted element 71 relative to the free end of the elastic flapper valve 20 valve, as heretofore explained with reference to FIG. 2. Furthermore, the gain of the accelerometer may be further adjusted by varying the relative locations of the nozzles 16 and 18 along the length of the flapper valve 20, as by adjusting the adjustable element 82, as shown in FIG. 3. Also one of the nozzles 16 or 18 may be selectively adjusted in one sense along the length of the flapper valve 20 while the other of the nozzles 18 or 16 may be selectively adjusted in another sense along the member 20 by slidably positioning the plates 91 and 93, as heretofore explained with reference to FIG. 4, so that if desired different predetermined output characteristics may be effected under accelerational and decelerational conditions, as indicated graphically in FIG. 7 by the dash lines.

Although several embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A fluidic control device comprising a base, an elastic flapper valve member secured at one end to the base, fluid pressure nozzles at opposite sides of the valve member and having openings adjacent the flapper valve member, the elastic flapper valve member being of an effective length including a free end portion positioned between the openings in the nozzles and responsive to accelerational and decelerational forces applied to the base along a sensitive axis extending transverse the elastic flapper valve member, fluid pressure means including the nozzles normally maintaining the free end portion of the movable flapper valve member in a position intermediate the openings in the nozzles and generating a differential pressure dependent upon the position of the free end portion of the movable flapper valve member in relation to the openings in the nozzles effected by the accelerational and decelerational forces applied along the sensitive axis, and independently adjustable means to separately vary the location of the nozzles along the length of the elastic flapper valve member so that the valve member selectively controls the nozzles to effect different predetermined fluid pressure output range characteristics in response to said applied accelerational and decelerational forces.

2. The combination defined by claim 1 including a weighted element, means to adjustably position the weighted element in relation to the free end portion of the flapper valve member so as to vary inertia of the elastic flapper valve, and slidable plate means to carry the nozzles, the independently adjustable means including means to separately vary the slidable plate means and thereby the location of the nozzles along the length of the elastic flapper valve.

3. The combination defined by claim 1 including means to vary the effective length of the elastic flapper valve member to vary the relation of the free end portion of the flapper valve member to the openings in the nozzles, and slidable plate means to carry the nozzles, the independently adjustable means including means to separately vary the slidable plate means and thereby the location of the nozzles along the length of the elastic flapper valve.

4. The combination defined by claim 1 including a weighted element, means to adjustably position the weighted element in relation to the free end portion of the flapper valve member to vary inertia of the elastic flapper valve member, means to vary the effective length of the elastic flapper valve member so as to vary the relation of the free end portion of the flapper valve member to the openings in the nozzles, a slidable plate to carry one of the nozzles, another slidable plate to carry the other nozzle, and independently adjustable means to separately vary the position of each of the slidable plates and thereby the location of the nozzles along the length of the elastic flapper valve and in opposite senses so that the valve member selectively controls the nozzles so as to provide a predetermined range of fluid pressure output values in response to the applied accelerational forces and another different predetermined range of fluid pressure output values in response to the applied decelerational forces.

5. A fluidic control device comprising a base, an elastic flapper valve member secured at one end to the base, fluid pressure nozzles at opposite sides of the valve member and having openings adjacent the flapper valve member, the elastic flapper valve member being of an effective length including a free end portion positioned between the openings in the nozzles and responsive to accelerational and decelerational forces applied to the base along a sensitive axis extending transverse the elastic flapper valve member, fluid pressure means including the nozzles normally maintaining the free end portion of the movable flapper valve member in a position intermediate the openings in the nozzles and generating a differential pressure dependent upon the position of the free end portion of the movable flapper valve member in relation to the openings in the nozzles effected by the accelerational and decelerational forces applied along the sensitive axis, and one of said fluid pressure nozzles having the opening thereof adjacent one side of the flapper valve being located at a greater distance along the length of the elastic flapper valve member than the opening of the other of said fluid pressure nozzles adjacent the opposite side of the flapper valve member so that the flapper valve member selectively controls the fluid pressure nozzles to effect different predetermined fluid pressure output range characteristics in response to applied accelerational and decelerational forces.

References Cited
UNITED STATES PATENTS

| | | | |
|---|---|---|---|
| 2,128,682 | 8/1938 | Manteuffel | 137—83 |
| 2,944,526 | 6/1960 | Jarvis | 73—514 |
| 3,014,373 | 12/1961 | Lindbom | 73—515 |
| 3,201,999 | 8/1964 | Byrd | 73—515 |
| 3,447,555 | 6/1969 | Jenney | 137—82 |

JAMES J. GILL, Primary Examiner

H. GOLDSTEIN, Assistant Examiner